Feb. 27, 1945.    G. H. KENDALL    2,370,173

ANTIFRICTION BEARING

Filed Aug. 25, 1941

INVENTOR
George H. Kendall
BY
Wooster & Davis
ATTORNEYS

Patented Feb. 27, 1945

2,370,173

UNITED STATES PATENT OFFICE 2,370,173

ANTIFRICTION BEARING

George H. Kendall, Noroton Heights, Conn., assignor of one-eighteenth to Elizabeth B. Dickson, one-eighteenth to T. C. Dickson, Jr., two-eighteenths to E. W. Bassick, Jr., one-eighteenth to Christine N. Bassick, one-eighteenth to Marshall M. Bassick, one-eighteenth to Paulina M. Bassick, one-eighteenth to Grace M. Bassick, and one-eighteenth to E. W. Bassick, all of Bridgeport, Conn.

Application August 25, 1941, Serial No. 408,267

7 Claims. (Cl. 308—195)

This invention relates to anti-friction bearings of either ball or any roller type, such as square, needle, taper, spherical, concave, etc., and may be employed for either radial, thrust or radial-thrust bearings, and has for an object to provide an improved bearing construction in which the manufacturing and finishing operations are greatly reduced and simplified, thus greatly reducing the cost of the bearing.

It is also an object to provide a construction in which the amount of high priced steel required is greatly reduced in the raw material form and in the fabricating operations to reduce scrap, waste, chips, etc.

It is a further object of the invention to provide a construction which lends itself more readily to mass production than the present methods.

With the foregoing and other objects in view I have devised a construction for manufacture by several of the preferred methods as illustrated in the accompanying drawing forming a part of this specification. It is, however, to be understood that I am not limited to the specific details shown but may employ various changes and modifications within the scope of the invention.

Figure 1:
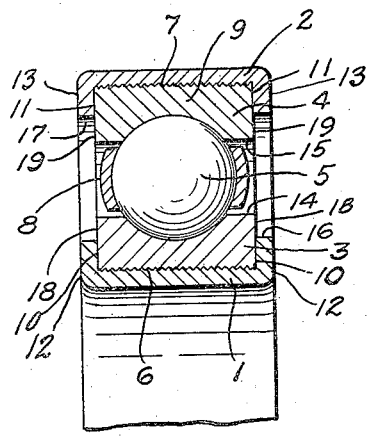
Fig. 1 is a transverse section through one side of a ball bearing showing my improved construction.

This application is a continuation in part of my prior application, Serial No. 357,107 of September 17, 1940.

The present standardized bearing construction consists of two special alloy steel rings hardened and normalized to produce an extremely hard surface for the balls to roll upon in carrying the load. This extreme degree of hardness was found to be of first importance to carry the rated load of the bearing and as necessary to prevent damage to the ring raceways by denting or ball or roller imprinting from rough handling or abuse of the equipment in which the bearings were mounted. This will be readily apparent when it is realized that there is a very small area of the ball or roller in contact with the raceway surface which must carry the load imposed.

The manufacture of these bearings involves turning the bearing rings of very tough steel from heavy bars, forgings or from very heavy steel tubes with the waste of nearly one-half or over (depending upon size) of the weight of the steel in chips, cut off ends, etc., and furthermore they require many additional finishing operations to bring the piece to the finished size. I have found that a raceway surface can be provided and maintained at the present necessary degree of hardness in a ring made of the special tough steel of a thickness as provided by the Stress formulaes of Streibeck and Hertz to carry the rolling load, and that the small balance of the usual size bearing ring shape can be made of softer and more readily workable materials than the tough machining alloy steels at present used in solid bearing members, as the load carried by the raceway ring would be distributed over large areas. Thus this raceway ring of tough hardened steel can be cast or molded in a supporting or mounting ring member in a die casting machine, plastic molding machine by the permanent mold method, or the centrifugal mold method, to produce bearing rings having an insert raceway ring of the necessary hardness and toughness. This would permit the use of softer and cheaper materials for the cast or molded or otherwise formed ring support, and the insert raceway ring of tough hardened steel would be cast or molded into this material and properly positioned and anchored in or bonded to the supporting material by the casting and molding operations.

Similar important advantages could be secured by permanently bonding the hardened metal raceway ring by copper brazing in a controlled atmosphere to the supporting or mounting ring member of different or softer metal. Important advantages in manufacture will also be secured if the backing member is of a similar material.

The above are the preferred constructions and methods of making because of their lower cost, but the insert raceway ring may be mounted in the supporting and backing up mounting member in other ways (presently to be described) which can be manufactured at lower cost than the present solid or one piece ring construction and therefore are of material advantage thereover.

The figures of the drawing illustrate by way of example a number of different applications for which this novel construction may be used.

Figure 2:
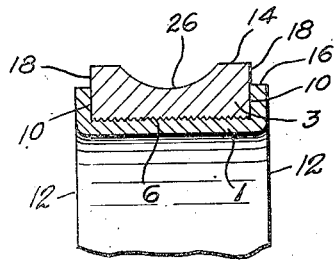
Fig. 2 is a transverse section of the inner member of the bearing construction of Fig. 1.

Referring first to Figs. 1 and 2 the inner and outer ring members of the bearing are shown at 1 and 2 respectively, these being made of cast or molded material and being cast or molded about the insert raceway rings 3 and 4 forming a raceway track for the balls 5. The material of the ring members 1 and 2 is cast or molded about the raceway rings 3 and 4 in any suitable manner, as in diecast molds in die-casting machines, suitable molds in plastic molding machines, by casting in permanent molds, or by casting by centrifugal mold method, and it is preferred that the surface of the insert ring at the opposite side from the ball track be knurled or otherwise roughened as indicated at 6 and 7 so that the cast or molded material will run into the depressions in the knurled or roughened surface to form a better bond between the insert raceway ring and the backing up or mounting material. These raceway rings 3 and 4 would be made of the special tough steel alloys now generally employed for the ring members of the ball and roller bearings and which can be treated to give the necessary hardness on the surface on which the rolling elements roll. These rings can be cut from steel tubing of the proper size and formed to shape or they may be made from strip steel rolled into a circle and welded at the abutting ends to make a one-piece solid ring, or made from flat wire or sheet or seamless, swaged or welded pipe or tubing as illustrative of some of the possible forms of fabrication. They can also be made by cold forming, by hot or cold steel fused at ends to make a fully continuous ring, by stamping, forging or turning methods as may best lend itself to the particular size, quantity, application or condition of manufacture. The rings are properly finished and hardened and then are held at the proper location in the mold by suitable holding and locating means, and the other material forming the backing and supporting material is poured into the mold or molded about the ring with suitable pressure. The knurled or roughened surfaces 6 and 7 are indicated only in Figs. 1 and 2, but it will be understood that the corresponding surface may be knurled or roughened in each of the other forms of the device shown in order to secure the better bond between the insert ring and the backing up or supporting metal or other material forming the body of the bearing rings, particularly where this backing up or supporting material is cast or molded against the insert ring, the showing of this roughened surface being omitted in the other figures of the drawing merely to simplify them. The balls in Fig. 1 are shown in the usual retainer 8 such as used in standard ball and roller bearings comprising two strips of steel stamped from sheet metal and formed and secured together by rivets or other suitable means (not shown) to retain the balls in proper alignment. These retainer elements can be made from strip metal formed to shape and their free ends welded or soldered to make continuous rings and eliminate the waste incident to stamping them from sheet metal. This retainer can be omitted if desired, as where the balls are in contact.

This process and construction uses the same basic function for its bi-metallic or bi-material construction as the present standardized construction as far as sizes and materials of the raceways, balls and retaining elements are concerned. That is, no attempt is made to alter the function or performance of the balls or rolling elements.

The improved bearing steels of today make possible far greater load carrying capacity for given bearing size load ratings so successfully established and accepted by all industries over the entire world. These established sizes therefore do not require a bearing ring thickness as great as when the sizes were initially established. A small part of the standard size ring may therefore be made of other material without affecting the proper raceway load carrying functions in the slightest degree. The small balance of the standard section over that of the raceway ring is supplied by softer and more easily workable material, yet fully capable of conservative support of a required load, making possible major reductions in cost of fabrication of ball and roller bearings of all types and sizes including such as cylindrical, needle, spherical, conical or tapered rollers as well as balls. The insert ring 3 or 4 of hardened metal is made of a thickness at its narrowest point 9 to carry the rolling load as conservatively figured by the established formulas of Streibeck and of Hertz for standard solid one-piece bearings so that this insert ring is capable of carrying the rolling load independently of the backing or supporting members, the backing or supporting members 1 and 2 being employed to fill out the size of bearing ring members to the standard size of the standard bearing of the one-piece solid hardened metal bearings which have been adopted as standard in industries throughout the world, in a far more economical manner than present processes of finishing.

It will be seen that the insert ring 3 or 4 forming the raceway for the rolling elements is of less width than the supporting or backing ring or member 1 and 2 so that the sides 10 and 11 of the insert ring are spaced inwardly from the sides 12 and 13 of the backing members 1 and 2. It will also be noted that in this construction the diameter of the face 14 and 15 of the insert ring on which the raceway or rolling surface is located is of a different diameter from that of the adjacent surface 16 and 17 of the backing or supporting ring member with which it is associated so that this face of the insert ring is spaced above that of the backing member. This eliminates the necessity of accurately finishing and lining up side surfaces 10 and 11 of the insert rings doing away with a large number of chucking operations required in finishing the one-piece solid bearing now generally employed. The elimination of the large number of chucking operations, thus greatly reduces the cost of manufacture, increases the percentage of bearings which are constructed to the proper dimensions and secures the necessary accuracy with less difficulty.

Because the faces 14 and 15 of the insert rings having the track or raceway are spaced above the adjacent surfaces 16 and 17 respectively of the backing members, a portion of the side walls of the insert rings indicated at 18 and 19 are exposed and not covered by the metal or material of the backing member. These uncovered surfaces are important as providing gripping surfaces to properly grip and hold the insert ring in the die during the casting or molding operation and also for later grinding or finishing of the raceway. If the insert ring is merely slid or forced onto the die pin, it is very apt not to be held in the proper position during the casting or molding operation because as soon as the hot metal or other material hits it, it is heated and expands fastenr than the large bulk of the die pin and therefore the ring loosens on this pin and is liable to be tilted sideways or otherwise forced out of position by the pressure of the material or the metal forced into the mold.

With this construction the insert ring can be gripped and held in the mold by its opposite sides 18 or 19 with no danger of its being loosened by heating from the die casting metal and then being forced out of position by the pressure of this metal or other molding material.

Of course it will be understood that the inner ring may be mounted on a shaft and the outer ring mounted in a suitable bearing block or other element, between which and the shaft will be relative rotation, and that either ring member may be the stationary element or the rotating element. Any suitable means may be used for securing the ring members in their supports.

Figure 3:
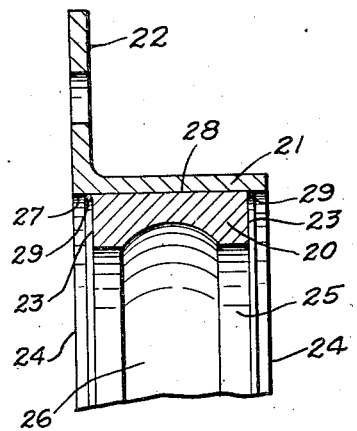
Figs. 3, 4, 5 and 6 are similar sections illustrating by way of example some of the different applications of my invention which may be employed.

In the arrangement of Fig. 3 the insert ring 20 corresponds to the rings 3 or 4 of Fig. 1 and the backing up member 21 brings the dimensions including the width and diameter of the bearing to those of the standard solid bearing. This shows that an additional element may be cast or molded with the backing member 21, such for example, as flange 22 for attaching to another member, a pulley flange or the like. It will be seen the backing member 21 is not extended over a portion of the sides 23 of the insert ring, but that the width of the insert ring is less than that of the backing member 21 so that the side walls 23 are spaced inwardly of the side walls 24 of the backing member. It will also be seen that the diameter of the face 25 of the insert ring in which is formed the raceway 26 for the rolling elements is of a different diameter than the adjacent surface 27 of the backing member so that this surface 25 is spaced above the surface 27. This has the same effect as the arrangement in Fig. 1 doing away with the necessity of finishing surfaces 23 and providing exposed surfaces for gripping of the insert ring 20 during the molding, casting or other finishing operations, particularly the finishing or grinding of the raceway 26. The backing member 21 may be die-cast or otherwise cast or molded about the member 20 the same as in Fig. 1 in which case the surface 28 would be roughened the same as the surface 6 of the first form to permanently bond the two elements together or if preferred the backing member 21 could be a stamping, forging or otherwise preformed element of different or softer metal or even of similar metal to the ring 20 and permanently bonded to the ring 20 by copper brazing in a controlled atmosphere. In this a copper wire 29 would be placed at the junction of two members and when heated in a controlled atmosphere to run between the contacting surfaces permanently brazing the two together so that they would not be separable by heating. Thus the assembly could while so heated for brazing be kept hot for the soaking, quenching operations of hardening the ring 20 without hardening or warping the backing member 21, if of non-hardening materials such as some mild steels thereby reducing numerous chucking and other finishing operations required of the standard one-piece bearing.

Figure 4:
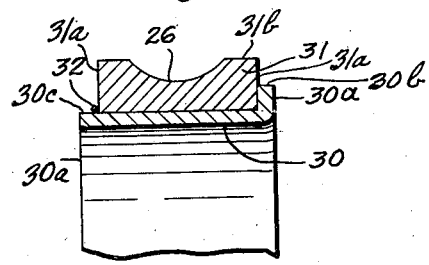

In Fig. 4 a flange or overlapping material of the backing member 30 at one side of the insert or raceway ring 31 is omitted. This backing or supporting member 30 may be cast or molded against the insert ring 31 in the same manner as in Figs. 1 and 2 to bring the assembled ring member to the width and diameter of the standard solid bearing.

This also illustrates how a ring of hardened steel in which the raceway ring or track is formed may be inserted in a backing ring of prefabricated but of softer and more workable material such for example as soft steels or nonferrous metals to complete the standard established bearing ring size of ball and roller bearing series.

Thus as the flange is omitted at one or both sides (as in Fig. 3) of the insert ring 31 or 20 this ring may be mounted on the backing member by heating and shrinking it or by cooling and expanding the inner or backing member. In this corresponding outer member of the bearing where the insert raceway ring is on the inside of the backing ring the backing ring will be shrunk onto the raceway ring or the raceway ring expanded onto the backing ring.

Also in this construction as in Fig. 3 the insert raceway ring 31 can be bonded to the supporting member 30 by brazing (either ordinary brazing or controlled atmospheric brazing), sweating or soldering (such as for example silver solder). Thus for example the rings 30 and 31 can be slipped or pressure forced together and a ring of copper or copper alloy wire 32 be placed at the joint between these members and the whole heated in a controlled atmosphere brazing standard furnace designed for that purpose, the copper flowing at the joint to completely bond the parts together as in effect one-piece so that they may be now hardened or otherwise worked. This is the so-called hydrogen brazing method of fabrication. The width of the insert ring 31 is less than that of the backing member 30 so that the side walls 31a are spaced inwardly from the side walls 30a and the diameter of the surface 31b carrying the raceway 26 is different from the diameter of the surface 30b and 30c so that it is spaced above these surfaces and a portion or all of the side walls 31a are exposed for gripping and holding the raceway ring during the molding or casting of the backing member or finishing of the raceway the same as described in connection with Figs. 1 to 3.

Figure 5:
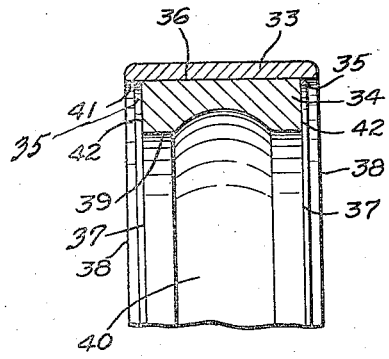

The backing or suitable supporting ring may be fabricated from rings or from sheet metal by continuous and progressive stamping, drawing and coining operations from one press so that no other finishing or sizing operations are required. This is shown in Fig. 5 where the backing member 33 may be of soft steel or metal tube, drawn to proper size and then cut off to proper width, and the insert or raceway ring 34 could also be cut from a drawn tube of the proper diameter and the two rings copper brazed together at their contacting surfaces either by a copper wire ring 35 or copper plating either one of the contacting surfaces 36 between the members and heating in a controlled atmosphere, or the backing ring 33 can be diecast or otherwise pressure cast or molded against the ring 34 the same as in the other forms. The width of the raceway ring 34 is also less than the backing member 33 so that the side walls 37 are spaced from the side walls 38. Also the diameter of the face 39 carrying the raceway 40 is of less diameter than the surface 41 to provide the exposed surfaces 42 corresponding to the surfaces 18 and 19 of Fig. 1 and similar surfaces of the other forms.

Figure 6:
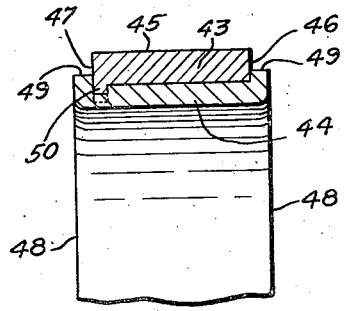

In Fig. 6 the raceway ring 43 corresponding to the rings 3, 4 and 20, etc., is mounted in cast or molded member 44 same as the other forms and the raceway surface 45 is shown as being flat for a cylindrical or tapered rolling element. If a tapered or other than straight element is used this surface would also be inclined, curved or tapered to suit spherical, conical, concave or other shaped rollers. The side walls 46 and 47 are spaced inwardly from the side walls 48 and extend above the surfaces 49 of the backing member to give gripping and holding surfaces for holding the insert in proper position during molding or casting of the backing member or finishing of the raceway the same as in the other forms. The reinforcing flange 50 may be provided to strengthen the ring and assist in bonding it to the backing member.

In all of the forms illustrated, which are shown by way of example, there being of course numerous other applications, the insert raceway rings are of tough hardened metal, such as the rings 3 and 4, etc. carried throughout the various figures. The balance of the bearing members consisting of the backing up ring members for the insert raceway, rings, such for example as the members 1, 2, 21, 30 and 33 and corresponding members carried throughout the various forms shown, can be made of softer and more readily workable materials than the tough hard alloy metal required for the insert raceway rings as the load from these insert rings is distributed over large areas. Thus the backing material for the insert raceway rings to prevent distortion of these rings can be of a softer alloy or other molded or cast material. This backing material may be of die-casting materials and alloys such for example as zinc, magnesium, aluminum, brass or bronze alloys in common use, which have excellent physical properties for this compression service, and these backing up ring members can be made in a die-casting machine, plastic molding machine, by permanent mold methods, or the centrifugal mold method, to produce the backing up bearing rings having inserted raceway rings. The insert rings can be suitably held and accurately positioned in the dies or molds and the liquid metal poured or cast about them or molded under pressure to produce the finished ring form substantially accurately to size so that only sizing operations may be necessary.

It will be seen that in each case illustrated the insert ring forming the raceway for the rolling elements is of less width than the supporting or backing ring or member so that the sides of the insert are spaced inwardly from the sides of the backing member. It will also be noted that in each form the diameter of the face of the insert ring on which the raceway or rolling surface is located is of a different diameter from that of the adjacent surface of the backing or supporting ring or member so that this face of the insert ring is spaced above that of the backing member. This eliminates the necessity of accurately finishing and lining up the side surfaces of the insert ring doing away with a large number of chucking operations required in finishing the one-piece solid bearing now generally employed. The elimination of the large number of chucking operations thus greatly reduces the cost of manufacture, increases the percentage of bearings which are constructed to the proper dimensions and also decreases the percentage of rejected bearings and secures the necessary accuracy with less difficulty.

Because the face of the insert ring having the track or raceway is spaced above the adjacent surface of the backing ring a portion of the side walls of the insert ring are exposed and not covered by the metal or material of the backing member. These uncovered surfaces are important as providing gripping surfaces for properly gripping and holding the insert ring in the die during the casting or molding operation, and also for finishing or grinding the raceway whether the ring is cast or molded in the backing member or whether it is bonded to it by copper brazing in a controlled atmosphere. With that construction because this ring can be so gripped and held either during molding or casting operations or with finishing of the raceway a large number of chucking operations are avoided which are necessary in the solid or one-piece bearings now generally employed, thus doing away with the large number of variables in the bearings that cause such unsatisfactory performance as to lead to rejection by the customer. They also form spaces where all types of shields, plates, labyrinths, seals or other grease, dirt or oil protecting elements may be easily attached.

Basically these variables are due to the many chucking operations required for the many step by step operations needed in finishing the bearing ring by the present standard methods of ball bearing manufacture. This also applies to all types of ball, roller and thrust bearings. From observation of these present day bearings, it is readily apparent that the diameter surface of the rings must be parallel; that the ring surfaces must be parallel; that the raceways must be parallel with both faces and diameter; and that all must be concentric (not eccentric) with each other for uniform or successful bearing performance. If these qualities are not rigidly maintained wobble of the rings, of the faces, of the diameters, or other errors of combinations of these faults will quickly cause bearing failure and wrecking of the bearing. Several of the more troublesome factors or faults resulting from or involved in the multiplicity of chucking errors in regular or standard ball bearing manufacture are as follows:

1. Lack of parallelism of faces.
2. Out of squareness of outside diameter to faces.
3. Out of squareness of the bore to faces.
4. Tapered bore.
5. Bellmouth of bore.
6. Large center of bore.
7. Unroundness of bore.
8. Unroundness of raceway with bore or outside diameter.
9. Eccentricity of raceway with bore or outside diameter.
10. Lack of squareness of raceway to bore or outside diameter (wobble).
11. Run-out of race-way to faces of rings.
12. Eccentricity of plate grooves to raceway.
13. Eccentricity of sealed surfaces to raceway.
14. Unevenness of corner radii or rings (causes cocking).
15. Raceway out of center with faces.
16. Protrusion of ring faces.

Each and every one of these common troubles either singly or in combination with others have caused most serious trouble and customer complaint whenever they occur in a bearing shipment. A little study of the above will clearly disclose what takes place within the bearing having these defects.

One of the main objects and results of this invention is to eliminate all or practically all of this multiplicity of chucking errors, causing such heavy losses and damaging effects on uniform quality, of the present method of manufacture (now sometimes running from 20% to 30%). Another object and result is to reduce the cost of high quality precision bearings.

This invention involves a new construction of bearing members or rings of standard sizes of bearings now recognized as standard throughout the world by the National and International Engineering Societies. This new construction involves no changes whatever in dimensional sizes, load carrying capacity, internal functions of the raceways, balls or retainers, so that the same normal functions of the bearing prevail as with the standard bearing. They are bearings of a different construction made to the same standard or finished sizes of standard bearings, but of a much more economical construction so that they may be manufactured at much less cost and with much less liability of errors. They can therefore be used in the same manner as the present standard bearings, but give great economy in the construction or production of the mechanism involved, and insure more dependable operation. Another advantage is that the backing-up member may be made of materials of lighter weight than the standard hardened steel of the solid ring, thus decreasing the weight of the bearing, which is of importance in airplane construction for example.

Thus this invention overcomes the multiplicity of chucking errors causing a slight eccentricity here and slight wobble there, which may be cumulative as the chucking operations are performed until the finished bearing becomes defective, rough, noisy and generally unsatisfactory. By removing some of the extra alloy steel from both the outer and inner bearing rings and replacing it with a softer material securely bonded to the ring either by pressure casting to the finished size of the standard ring in one operation or by copper brazing, it was found that it would be possible and entirely practical to eliminate the multiplicity of chucking errors. Also that this could be positively assured by proper production molds, of practically perfect accuracy of these vitally important surface relations of parallelism, roundness, concentricity, etc. and proper sizing for uniform successful mass production and operation of bearings.

I am, however, not limited to the use of metal for these backing up or mounting rings but may use other molding materials applied as liquids, powders or plastics under high pressure or by centrifugal force. Thus in addition to the metals and alloys mentioned may be used acrylic, cellulose acetate, phenolic resins, urea, vinyl, etc. among the various molding plastics, and the mild soft steels, hard steel alloys, manganese bronzes or other high melting point alloys for the centrifugal permanent mold casting method.

With this construction and method of making bearings it is possible to secure finished grooves, slots, tap holes, inserted bolts, nuts, rivets, etc. in the one operation of casting. Also, the marking or stamping operation of the rings may be made in the mold, thus eliminating these extra operations required with the present constructions.

It will be evident that this new process compared with the present method of turning bearing rings of toughest steel from heavy bars or steel tubes with the great waste of nearly one-half of the steel or more in chips, etc., as well as the one or more finishing operations required to bring these pieces to the finished size, illustrates some of the major economies secured with this new construction and method of making. The insert raceway rings would be hardened before die-casting or molding the backing up members so that when the die-casting is trimmed of fins it will be complete and ready for the final raceway grinding and lapping operations in the conventional manner.

The present die-casting process accuracy is such that only quickly made sizing operations, such as ball drift, burnishing or bearing sizing would be necessary for the extreme superprecision accuracy applications on bore and outside diameter.

Another advantage of this process and construction is that it will enable the designer to have the bearing outer ring cast or molded into a great variety of shapes or with bosses, ears or lugs to enable bolting directly to cast housings without machine boring of the housings, which opens up an entirely new field to the designer for reduction of construction costs in mass production. Some examples of this are shown in the drawing, as for example in Fig. 3.

This construction has a further advantage in shop fabrication in the precision bearing industry in that whenever machining tolerance errors produce scrap or discards the parts are not entirely lost as in the present constructions, but can be remelted with loss only of the insert raceway ring and the small amount of labor involved.

The bearings will have a great advantage in the aircraft industry for all applications, as when used with the magnesium alloys the total bearing weight will be considerably less than the present all steel bearing for the same service.

Also, when used with certain other die-cast alloys these bearings will have particular appeal for special acid and other applications of process industries.

This bearing further provides a ready construction for such unusual applications as the water cooled bearing ring so badly needed in many high temperature applications in process industries, as the water cooling passages can be cast into the metal of the rings.

There are other numerous applications and advantages which will be apparent and will suggest themselves from the foregoing description and the examples illustrated in the accompanying drawing.

Throughout the specification and claims I have used the terms "casting" and "molding" as practically synonymous, as castings are formed and shaped in molds and therefore casting is broadly a molding operation. Also, shaping and molding such materials as the non-ferrous plastics may be broadly called a casting operation as they are shaped in molds.

Although casting or molding has been described as the preferred method of fabricating because of its low cost and adaptability to quantity production, examples of different methods by which these bearings may be fabricated have also been mentioned. The basic feature is the insert raceway ring of suitable material of a thickness to provide the proper surface and support for the balls or other rolling elements to run on inserted or mounted in or on a suitably formed backing material, this backing up and supporting material being of different, and usually softer material which can be more readily worked. This supporting material brings the bearing to standard size and the raceway ring is inseparably mounted on it. The term inseparably mounted includes casting, molding or forming the backing material about or against the ring, expanding the inner member or shrinking the outer member, controlled atmosphere brazing, brazing, sweating and soldering, or otherwise bonding or connecting so they are inseparable in use and in effect one piece.

Although hardened steel has been mentioned as the material that would probably be most generally used for the insert raceway ring, it is to be understood that the invention is not limited to use of this material. Thus, for example, stainless steel is often required, or the use of bronze or glass may be required as materials for special jobs such as would be needed on process industries in the presence of acids in gaseous or liquid form.

Having thus set forth the nature of my invention, what I claim is:

1. An antifriction bearing ring comprising two ring sections only, one of said ring sections comprising a single one piece preformed continuous hardened metal ring forming a track for the rolling elements and of sufficient thickness to carry the normal rolling load, and the other ring section comprising a single one piece ring of different metal cast to finished size against the first ring section and permanently bonded thereto, said second ring being of a degree of hardness to withstand the load without materially changing its repose dimensions, the track ring being of less width than the backing ring so that its side walls are spaced inwardly of the side walls of the backing ring and the diameter of its face having the track being different from that of the corresponding face of the backing ring so that it is spaced above this face.

2. An antifriction bearing member comprising a single one piece preformed continuous hardened metal ring forming a track for the rolling elements and of sufficient thickness to carry the normal rolling load, a single one piece supporting backing member for said ring made of formed metal of the size and shape of the finished bearing and of a degree of hardness to withstand the load without materially changing its repose dimensions, the track ring being of less width than the backing member so that its side walls are spaced inwardly of the side walls of the backing member and the diameter of its face having the track being different from that of the adjacent face of the backing member so that it is spaced above this face, and said ring and backing member being permanently bonded together by copper brazing in a controlled atmosphere.

3. An antifriction bearing member comprising a single one piece preformed continuous circular ring of hardened metal forming a track for the rolling elements and of sufficient thickness to carry the normal rolling load, and a single one piece continuous supporting backing member for said ring permanently bonded to the ring and formed of a different and softer metal from the ring but of a degree of hardness to withstand the load without materially changing its repose dimensions, said backing member being of greater width than the ring, and the diameter of the surface of the ring having the track being different from that of the adjacent surface of the backing member so that it is spaced above this latter surface.

4. An antifriction bearing member comprising a single one piece preformed continuous circular ring of hardened metal forming a track for the rolling elements and of sufficient thickness to carry the normal rolling load, and a single one-piece continuous backing and supporting member for the ring of different and softer metal pressure cast to substantially the finished size and shape against the ring and permanently bonded to the ring to complete the form of the finished bearing member, said backing member being of greater width than the ring so that the side walls of this member are spaced outwardly of the side walls of the ring and the diameter of the face of the ring having the track being different from that of the adjacent surface of the backing member so that it is spaced above this surface.

5. An antifriction bearing member comprising a single one piece preformed continuous circular ring of hardened metal having a surface forming a track for the rolling elements and of sufficient thickness to carry the normal rolling load, a single one piece continuous backing and supporting member for the ring composed of a different material pressure cast against the ring and permanently bonded to the ring, said backing member being of greater width than the ring so that the side walls of this member are spaced outwardly of the side walls of the ring, and the circular surface of the face of the ring having the track surface being above the adjacent surface of the backing member to provide exposed shoulders on the sides of the ring spaced inwardly of the sides of the backing member.

6. A two element antifriction bearing ring member comprising a one piece preformed continuous circular hardened metal insert ring forming a track for the rolling elements and of sufficient thickness to carry the normal rolling load, and a one piece supporting and backing ring for the insert ring of metal but of a degree of hardness to withstand the load from the insert ring without materially changing its repose dimensions, said insert and backing rings being permanently bonded together, said insert ring being of less width than the backing ring so that the side walls of the backing ring are spaced outwardly of the side walls of the insert ring and the diameter of the face of the insert ring having the track being different from that of the adjacent surface of the backing ring so that it is spaced above this latter surface.

7. A two element antifriction bearing member comprising a one piece preformed continuous circular hardened metal insert ring forming a track for the rolling elements and of sufficient thickness to carry the normal rolling load, and the remainder of the member being a one-piece supporting backing ring for the insert ring made of a different and softer material but of a degree of hardness to withstand the load from the first ring without materially changing its repose dimensions and to which the insert ring is permanently bonded, said backing ring being of greater width than the insert ring so that the side walls of the backing ring are spaced outwardly of the side walls of the insert ring and the circular face of the insert ring having the track surface being above the adjacent surface of the backing ring to provide exposed surfaces on the sides of the insert ring spaced inwardly of the sides of the backing ring.

GEORGE H. KENDALL.